Patented Dec. 25, 1928.

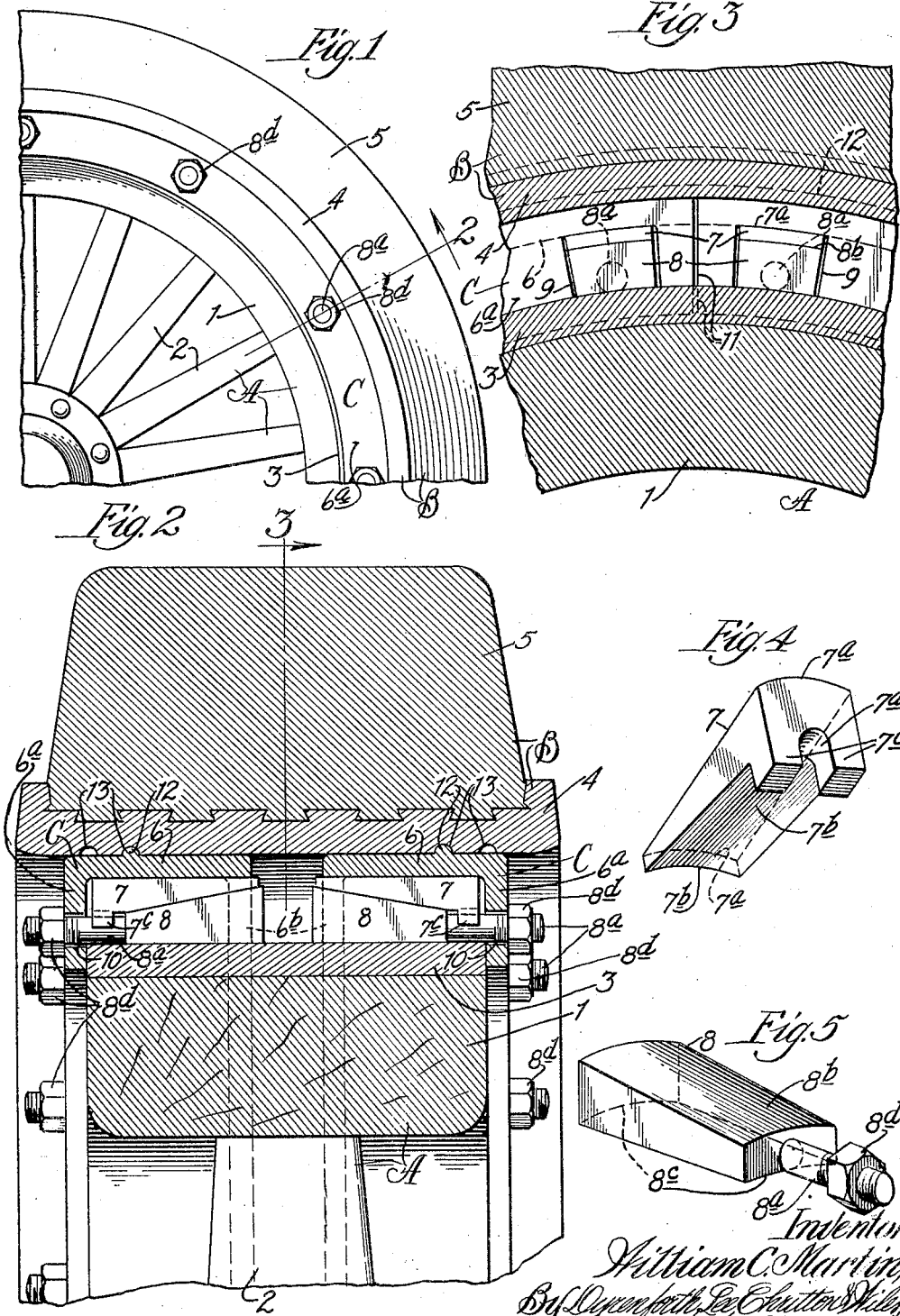

1,696,405

UNITED STATES PATENT OFFICE.

WILLIAM C. MARTIN, OF CHICAGO, ILLINOIS, ASSIGNOR OF ONE-FIFTH TO JOHN H. LEE, OF OAK PARK, ILLINOIS.

WHEEL CONSTRUCTION.

Application filed February 18, 1928. Serial No. 255,345.

This invention relates particularly to wheels equipped with rubber tires; and the primary object is to provide improved means for securing a tire upon the rim of a wheel-center.

The invention is illustrated in a preferred embodiment in the accompanying drawing, in which—

Fig. 1 is a broken elevational view of a wheel embodying the invention; Fig. 2, a broken section taken as indicated at line 2 of Fig. 1; Fig. 3, a broken section taken as indicated at line 3 of Fig. 2; Fig. 4, a perspective view of a wedge-block employed; and Fig. 5, a perspective view of a companion wedge-block employed.

In the illustration given, the wheel-center, designated A, comprises a felly 1, spokes 2, and a steel band 3 shrunk upon the felly; and the tire, designated B, comprises an annular steel base-rim 4 and another tire-member 5 of rubber mounted thereon and preferably vulcanized thereto.

The tire B is securely mounted on the wheel-center through the medium of a pair of supporting-rings C and associated wedge-blocks.

The rings C preferably are split-rings. Each ring is of channel-form cross-section, having a cylindrical portion 6, an inturned outer flange $6^a$, and an inturned inner flange $6^b$. The flange $6^b$ has its inner edge curved to conform to the band 3. The outer flange $6^a$ is of sufficient depth to engage the edge of the rim 3.

Each of the rings C is secured between the band 3 of the wheel-center and the member 4 by means of a series of complemental wedge-members 7 and 8. Preferably the inner flange $6^b$ is provided with slots 9 at points where the wedge-members 7 and 8 are located, and the outer flange is provided with a series of perforations 10 adapted to receive the bolts $8^a$ with which the wedge-members 8 are equipped.

The outer wedge-member 7 preferably is a segmental member having a convex outer surface $7^a$ and a concave inner surface $7^b$. At the outer end, the wedge-member 7 is provided with an inturned (radial) flange $7^c$ having a passage $7^d$ through which the bolt $8^a$ may extend. Thus, the flange $7^c$ is furcated to permit the passage of the bolt.

The inner wedge-member 8 also is segmental, having a convex outer surface $8^b$ and a concave inner surface $8^c$.

The inner ends of the wedge-members are adapted to extend through the slots with which the flange $6^b$ is provided. It will be understood that the construction of each ring and the associated wedge devices are the same. The bolts $8^a$ are equipped with nuts $8^d$.

In Fig. 3, the slight space between the ends of the split-ring is designated 11.

The cylindrical portion 6 of the ring is provided on its outer surface with a circumferential bead 12; and the inner surface of the tire-base 4 is provided with a pair of spaced annular grooves 13, either one of which may receive the bead 12.

In the illustration given, the projecting beads 12 are shown in engagement with the inner grooves 13 with which the steel-base 4 of the tire is provided.

In the case of a wheel-center having a wider felly, the rings C may be more widely separated. In that case, the beads 12 may engage the outer grooves 13.

From the description given, it will be understood that the inner wedge-members 8 are adapted to be drawn outwardly (toward the lateral side of the wheel by means of the nuts $8^d$); also that the overlying wedge-members 7 are confined against outward movement by the outer flanges $6^a$ of the rings. Thus, a wedging effect is secured. In practice, this wedging effect can be secured with only slight movement of the wedge-members 8, so that the inner edges of the inner flanges $6^b$ of the split-rings remain closely adjacent the outer surface of the steel-band 3 of the wheel-center. Thus, the flanges $6^b$ are adapted to contact with the steel-band 3 in the event of any slight inward springing of the central portion of the tire. The flanges $6^b$, in connection with the wedges, are adapted to strongly support the center portion of the tire. Moreover, the inturned flanges of the split-ring give great strength to the ring in the spaces intervening between the wedge-devices circumferentially of the wheel.

In practice, the wedge-devices are placed rather close together, so that the double-flanged split-ring effectively bridges the spaces between the successive wedge-devices and the tire is thus firmly supported on the wheel-center.

The split-rings may be formed by rolling channel-bars and then curving them into ring-form. The wedge-devices may be cast to the desired form, or approximately the desired form, and machined, if desired.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In combination, a wheel-center, an encircling tire having an annular base, a pair of channel-form rings interposed between the wheel-center and said annular base, and a series of wedge-devices associated with each ring, said wedge-devices comprising a pair of complemental wedge-members, one of which is provided with a bolt extending through the outer flange of the ring and equipped with a nut at the outer side of said flange.

2. In combination, a wheel-center, an encircling tire having an annular base, a pair of split-rings of channel-form cross-section having inner flanges interposed between the wheel-center and said annular base and having outer flanges engaging the edges of the rim-portion of the wheel-center, a series of wedge-members lying adjacent the inner surface of the cylindrical portion of each ring and having tapering lower surfaces, and a series of companion wedge-members underlying the first-mentioned wedge-members and having threaded bolts extending through perforations in the outer flanges of said rings and equipped outside said flanges with nuts.

3. In combination, a wheel-center, an encircling tire having an annular base, a pair of split-rings of channel-form cross-section, each ring having an inner flange interposed between the wheel-center and said annular base and provided with a series of slots, the outer flanges of said rings being provided with perforations, and a pair of wedge-members associated with each slot, said wedge-members having tapering adjacent surfaces and one wedge-member of each pair having threaded bolts projecting therefrom through a perforation in the outer flange of the ring and equipped outside the outer flange with a nut.

4. In combination, a wheel-center, an encircling tire having an annular base, a pair of split-rings of channel-form cross-section, equipped at their outer circumferential surfaces with beads engaging annular recesses with which said annular base is provided, and a series of pairs of wedge-members associated with each ring, each pair of wedge-members comprising an outer wedge-member engaging the inner surface of the cylindrical portion of the corresponding ring and an inner wedge-member underlying the same and engaging the wheel-center, the inner wedge-member having a threaded bolt extending through the outer flange of the ring and equipped with a nut.

5. In combination, a wheel-center, an encircling tire having an annular base, a pair of split-rings of channel-form cross-section having inner flanges provided with slots and having outer flanges adapted to engage the lateral edges of the wheel-center and perforations extending through said outer flanges outside the wheel-center, and a series of pairs of wedge-members associated with each ring, each pair of wedge-members comprising an outer segmental member and an inner segmental member extending through the corresponding slot, one of said members being provided with a threaded stud extending through a perforation in the outer flange of the ring and equipped with a nut.

WILLIAM C. MARTIN.